Dec. 18, 1951  L. B. BORST ET AL  2,579,225
ADJUSTABLE SUPPORT FOR SPECTROMETER REFLECTORS
Filed Sept. 20, 1946
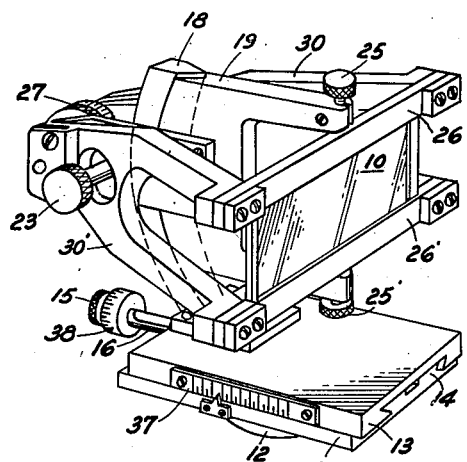
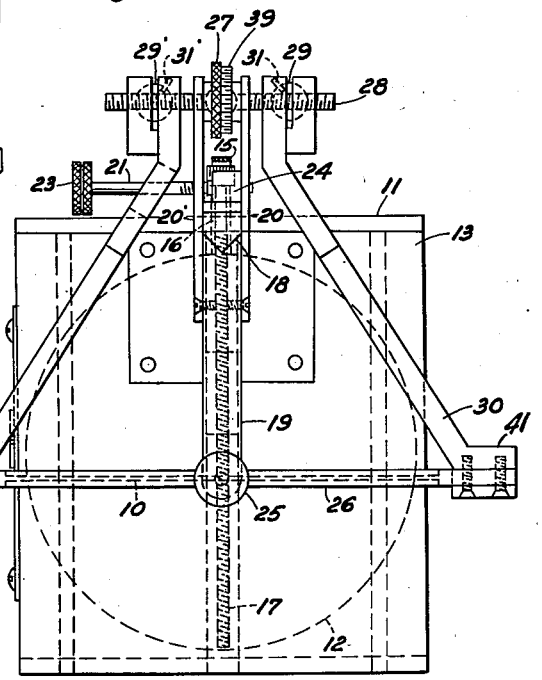
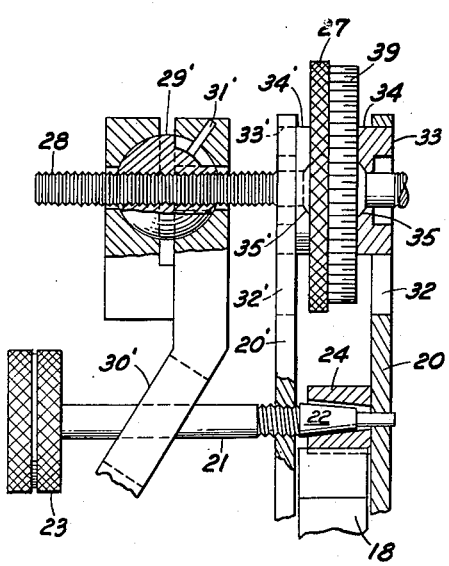
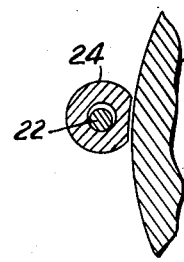
Fig. 1.
Fig. 2.
Fig. 3.
Fig. 4.
INVENTORS
Lyle B. Borst &
BY Richard J. Fox
ATTORNEY Patented Dec. 18, 1951

2,579,225

UNITED STATES PATENT OFFICE 2,579,225

ADJUSTABLE SUPPORT FOR SPECTROMETER REFLECTORS

Lyle B. Borst and Richard J. Fox, Oak Ridge, Tenn., assignors to the United States of America as represented by the United States Atomic Energy Commission Application September 20, 1946, Serial No. 698,340

8 Claims. (Cl. 88—73)

This invention relates generally to the art of spectrometry, and, more particularly, to apparatus forming a support for the reflecting element of a spectrometer and including means for adjusting the radius of curvature of said reflecting element.

In U. S. application Serial Number 669,536 for Spectrometer filed May 14, 1946 in the name of Lyle B. Borst, there is disclosed a system of spectrometry wherein it is necessary to provide a reflecting element or reflector whose radius of curvature is adjustable. The present invention provides mounting and bending mechanism for a spectrometer reflector, which mechanism is particularly adapted for use in such a system. Besides providing adjustment for the radius of curvature of the reflector, the mounting arrangement of the present invention also provides a linear adjustment of the position of the reflector, and an angular adjustment of the reflector about a horizontal axis.

Accordingly, it is a primary object of the present invention to provide a mounting mechanism for a spectrometer reflector wherein a manual adjustment is provided for the radius of curvature of said reflector.

It is an object of the present invention to provide apparatus for use in a spectrometer for mounting the reflecting element and simultaneously providing an adjustment of the radius of curvature of said reflecting element and an adjustment of its lateral position.

It is still another object of the present invention to provide a mounting arrangement for a reflector for use in a spectrometer wherein manual means are provided for adjusting the radius of curvature of said reflector, adjusting its lateral position, and adjusting its angular position about a horizontal axis.

Other objects and advantages of the present invention will become apparent from the following description taken in connection with the accompanying drawings, wherein one embodiment of the invention is illustrated.

In the drawings,

Fig. 1 is a perspective view of the reflector element mounting arrangement of the present invention, Fig. 2 is a plan view of the mounting arrangement, Fig. 3 is an exploded view, partly in section, of a detail of Fig. 2, and Fig. 4 is a sectional view of a detail of Fig. 3.

Referring now to the drawings, reference numeral 11 designates a base member having integral therewith on its under side a circular section 12 which section is adapted to be pivotally mounted on conventional spectrometer apparatus for rotation about a vertical axis. Base member 11 supports on its upper side a rectangular supporting plate 13. Member 11 and plate 13 are provided with inter-related guide members and grooves, indicated generally at 14, whereby relative lateral movement between the two is permitted in one direction. Lateral adjustment of plate 13 with respect to base 11 may be made by means of manual adjusting knob 15 which is connected to actuate a worm screw 17, rotatably supported within hollow shaft 16, which worm screw engages a threaded portion of base 11 in the manner of a lathe cross feed mechanism. The relative position of plate 13 with respect to base 11 may be obtained from the pointer and scale arrangement, indicated at 37. A vernier reading of this lateral adjustment is provided on graduated scale 38.

Mounted on plate 13, and extending upwardly therefrom, is a circular track section 18 on which the remaining portion of the apparatus is adjustably mounted. A U-shaped member 19 is shaped on its rear side to form a second circular track section which is adapted to mate with section 18. Bolted to member 19, and extending rearwardly therefrom past section 18, are two parallel arms 20, 20'. A spindle member 21 extends through arms 20, 20' and has a tapered portion 22 in the region between the arms and adjacent the rear of section 18, as may be most clearly seen in Fig. 3. Spindle 21 engages arm 20' in screw threaded relationship and is pivotly supported at its end by a suitable hole in arm 20. A manual adjustment knob 23 is provided to actuate spindle 21. A generally cylindrical clamping member 24 is associated with the tapered portion of spindle 21 and is held thereby between arms 20 and 20'. The inner surface of member 24 is tapered, as shown, to mate with the tapered portion 22 of spindle 21, and, as shown in Fig. 4, the outer surface of member 24 has an arcuate section formed therein of a radius of curvature equal to that of the rear surface of the circular section 18, whereby it is adapted to mate with the rear surface of section 18. The just-described clamping arrangement is adapted to maintain member 19 held tightly against section 18 in its desired angular position when knob 23 is screwed tight.

At the inner ends of the legs of U-shaped member 19, there are provided two pivots 25, 25', having screw threaded adjustments, as shown, the purpose of these pivots being to hold the reflecting element 10 stationary at its center. Engaging pivots 25 and 25' are frame members 26, 26', which are slotted on their inner sides to accommodate the reflector 10. The center of curvature of track section 18 lies at the central point of reflector 10. It will be apparent, therefore, that the arrangement thus far described for holding and clamping member 19 in variable positions with respect to section 18, provides a means for adjusting the angular position of reflector 10 about a horizontal axis through its center.

The manual adjustment of the radius of curvature of reflector 10 is provided by adjustment knob 27, rotation of which is adapted to rotate the horizontal screw 28 which is oppositely threaded at its opposing ends. Two spherical members or balls 29, 29' are provided in screw threaded relationship with screw 28, one on either side. Rotation of adjustment knob 27 simultaneously moves both balls 29, 29' either outwardly or inwardly. Supported by balls 29, 29', respectively, but rotatable with respect thereto about a normally vertical axis, are two arm members 30, 30'. Each of arm members 30, 30' is generally U-shaped, looking from the side, and the legs of the U-shaped portions terminate in horizontal portions 41, 41' which extend along the frames 26, 26' for a short discrete distance and which are bolted to these frames, whereby the angular position of these arms control the angular position of the extremities of reflector 10. A slot and pin arrangement, indicated generally at 31', is provided in the connection between ball 29' and arm 30', the slot extending horizontally along the surface of the ball, whereby angular rotation of arm 30' with respect to ball 29' is permitted only in a normally horizontal plane. A similar slot and pin arrangement 31 is provided in the connection between ball 29 and arm 30.

Screw 28 and its associated mechanism is supported by parallel arms 20 and 20'. For this purpose, horizontally extending slots 32, 32' are provided in bars 20, 20', respectively, and engaging these slots are ears 33 and 33' formed in washer members 34, 34'. Washers 34 and 34' have concave, spherical inner surfaces which mate with and bear against convex, concentric, spherical shoulders 35 and 35' which may be formed as an integral part of the screw 28 and adjustment knob 27. Arms 20 and 20' are provided with a certain amount of spring action tending to force these arms inwardly, whereby the washers 34 and 34' hold the adjustment knob 27 and associated mechanism firmly in place, but still permit rotational play about any axis passing through the spherical center of shoulders 35 and 35', however, allowing no lateral play in any direction.

In operation, when the adjustment knob 27 is rotated, balls 29 and 29' are moved either inwardly or outwardly by equal distances, whereby arms 30 and 30' are caused to experience simultaneously an angular rotation in a horizontal plane and a lateral displacement, also in a horizontal plane. Slots 32 and 32' in arms 20 and 20' are provided in order to enable this lateral displacement to take place, the screw 28 and associated mechanism moving bodily along the slots 32 and 32', as required. The resultant movement of the legs of arms 30 and 30' force the reflector 10 to bend about a central axis defined by pivots 25 and 25', thus varying the radius of curvature of the reflector. The radius of curvature of reflector 10 at any setting of adjustment knob 27 may be read on a graduated scale 39 attached to the adjustment knob.

Since many changes in the above construction, and many apparently widely different embodiments of the invention could be made without departing from the scope thereof, it is intended that all matter contained in the above description, or shown in the accompanying drawings, shall be interpreted as illustrative and not in a limiting sense.

What is claimed is:

1. In a spectrometer system, means forming a reflecting surface for incident radiant energy, spaced pivot means engaging the center of opposite sides of said reflecting means for holding said reflecting means stationary along a central pivot axis, two spaced arms having end portions engaging opposite ends of said reflecting means over a short discrete distance, whereby the angular orientation of said arms controls the angular orientation of the engaged portions of the ends of said reflecting means, and manually adjustable means for rotating said arms equally in opposite directions in a plane which is perpendicular to the said pivot axis, whereby said reflecting means may be bent into a substantially cylindrical surface of adjustable radius of curvature.

2. Apparatus, as claimed in claim 1, wherein said last-named means comprises a manually rotatable screw having oppositely threaded end portions, two tapped balls engaging said respective end portions, and means forming a pivoted connection between said balls and said respective arms.

3. Apparatus, as claimed in claim 1, wherein said last-named means comprises a manually rotatable screw having oppositely threaded end portions, two tapped balls engaging said respective end portions, cupped portions formed in said respective arms, forming ball joint connections between said balls and said arms, and a slot and pin arrangement associated with each of said ball joint connections permitting rotation of said arms with respect to said balls only in a plane which is perpendicular to the said pivot axis.

4. Apparatus, as claimed in claim 1, wherein said last-named means comprises a manually rotatable screw having oppositely threaded end portions, two tapped balls engaging said respective end portions, means forming a pivoted connection between said balls and said respective arms, and a support for said screw means, said support having a slot accommodating said screw means and permitting movement thereof only in a plane which is perpendicular to the said pivot axis.

5. In a spectrometer system, means forming a reflecting surface for incident radiant energy, spaced pivot means engaging the center of opposite sides of said reflecting means for holding said reflecting means stationary along a central pivot axis, two spaced arms having at one end thereof end portions engaging opposite ends of said reflecting means over a short discrete distance, whereby the angular orientation of said arms controls the angular orientation of the engaged portions of the ends of said reflecting means, an adjustable arm supporting mechanism including means for pivotally supporting the other end of each of said arms for rotation about respective axes which are parallel to the said pivot axes, and manually adjustable means for rotating said arms about their respective axes in opposite directions, and a slotted supporting structure for said mechanism, said mechanism being supported in the slot of said structure for free movement along the slot, said slot lying in a plane which is perpendicular to the said pivot axis.

6. In a spectrometer system wherein the reflector must be manually rotatable around an axis passing through its center, in combination, a supporting base plate, an upwardly extending section of circular track mounted on said plate, a reflector and a reflector mounting assembly, said assembly having a second section of circular track positioned to mate with said first mentioned section, both of said sections having a center of curvature positioned at the center of said reflector, and means for retaining said assembly at any desired angular position with respect to said first mentioned section.

7. Apparatus, as claimed in claim 6, wherein said last-named means includes two parallel arms mounted on said assembly and extending beyond said first-mentioned section, a manually rotatable spindle pivotally mounted on said arms in screw-threaded relationship with one of said arms, said spindle being tapered in the region between said arms adjacent said first-mentioned section, and a generally cylindrical member having a tapered inner surface mating with the tapered portion of said spindle, said member having an arcuate groove on its external surface extending longitudinally of said member and mating with said first-mentioned section.

8. In a spectrometer system, a supporting base plate, an upwardly extending section of circular track mounted on said plate, a reflector, a central plate lying in the same plane as said circular track, said plate having spaced pivot means on its forward end for holding said reflector stationary at its center and having a second section of circular track at its rearward end positioned to mate with said first mentioned section, both of said sections having a center of curvature positioned at the center of said reflector, a pair of parallel arms mounted on opposite sides of said central plate and extending rearwardly beyond said first mentioned section, a manually rotatable spindle pivotally mounted on said arms in screw-threaded relationship with one of said arms, said spindle being tapered in the region between said arms adjacent the rear of said first mentioned section, a generally cylindrical hollow member having a tapered inner surface mating with the tapered portion of said spindle, said member having an arcuate groove on its external surface extending longitudinally of said member and mating with the rear of said first mentioned section, a manually rotatable screw pivotally mounted between said first mentioned pair of arms to the rear of said spindle, said screw having oppositely threaded end portions extending through and beyond said arms respectively, two tapped balls engaging said respective end portions, and a second pair of spaced arms, disposed on opposite sides of said central plate, and engaging at their forward end opposite ends of said reflector, and having at their rearward end cupper portions engaging and forming ball joint connections with said balls respectively.

LYLE B. BORST.
RICHARD J. FOX.

REFERENCES CITED

The following references are of record in the file of this patent:

UNITED STATES PATENTS

| Number | Name | Date |
|---|---|---|
| 582,856 | Frostenson | May 18, 1897 |
| 1,457,209 | Chanier | May 29, 1923 |
| 1,618,985 | Kelly et al. | Mar. 1, 1927 |
| 1,910,119 | Moats | May 23, 1933 |
| 2,013,882 | Francis | Sept. 10, 1935 |
| 2,337,898 | Jobe et al. | Dec. 28, 1943 |